United States Patent
Ohbayashi et al.

(10) Patent No.: US 7,548,524 B2
(45) Date of Patent: Jun. 16, 2009

(54) COMMUNICATION SYSTEM, COMMUNICATION TERMINAL, ROUTING CONTROL METHOD, AND ROUTER

(75) Inventors: Takayuki Ohbayashi, Miura (JP); Takatoshi Okagawa, Yokosuka (JP); Katsutoshi Nishida, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 761 days.

(21) Appl. No.: 10/935,265

(22) Filed: Sep. 8, 2004

(65) Prior Publication Data

US 2005/0053011 A1 Mar. 10, 2005

(30) Foreign Application Priority Data

Sep. 8, 2003 (JP) ............................. 2003-316011

(51) Int. Cl.
*H04Q 7/24* (2006.01)
*H04L 12/66* (2006.01)

(52) U.S. Cl. ..................... 370/331; 370/338; 370/349; 370/352

(58) Field of Classification Search ..................... None
See application file for complete search history.

(56) References Cited

U.S. PATENT DOCUMENTS

| | | | | |
|---|---|---|---|---|
| 6,940,869 B1 * | 9/2005 | Wang et al. | ............... | 370/466 |
| 7,133,386 B2 * | 11/2006 | Holur et al. | ............... | 370/331 |
| 7,149,521 B2 * | 12/2006 | Sundar et al. | ............ | 455/435.1 |
| 7,171,215 B2 * | 1/2007 | Khouaja et al. | ........... | 455/452.2 |
| 7,280,505 B2 * | 10/2007 | Chaskar et al. | ............. | 370/331 |

FOREIGN PATENT DOCUMENTS

JP 2000-183972 6/2000

OTHER PUBLICATIONS

Takatoshi Okagawa, et al., "IP Packet Routing Mechanism Based on Mobility Management in IP-base IMT Network Platform", Network Laboratories, NTT DoCoMo Inc., ICIN, 2003.

Takatoshi Okagawa, et al., "Basic primitives and packet transmission mechnaism in $IP^{2}$", Network Laboratories, NTT DoCoMo Inc., Technical Report of IEICE, The Institute of Electronics, Information and Communication Engineers, Nov. 2002.

Manhee Jo, et al., Addresses interchange procedure in mobility management architecture for IP-based IMT network platform ($IP^2$), Telecommunications, ICT, $10^{th}$ International conference, XP-010637794, Feb. 23, 2003, pp. 118-123.

C. Perkins, "IP Mobility Support", Network Working Group Request for Comments 2002, Category: Standards Track, XP-002187650, Oct. 1996, 67 pages.

* cited by examiner

*Primary Examiner*—Chi H. Pham
*Assistant Examiner*—Soon D. Hyun
(74) *Attorney, Agent, or Firm*—Oblon, Spivak, McClelland, Maier & Neustadt, P.C.

(57) ABSTRACT

A mobile terminal MN1 according to the present invention judges, based on a router advertisement transmitted from an access router AR1, whether handover is to be executed between access points (APs) connected to the access router AR1, and transmits a link moving notification, which indicates that handover is executed under control of the access router AR1, to the access router AR1. Further, the access router AR1 updates only routing information based on the received link moving notification.

5 Claims, 9 Drawing Sheets

|  | IPha | IPra | time |
|---|---|---|---|
| CST | MN1-ha | MN1-ra | 0 |
| CDT | MN2-ha | MN2-ra | 5 |

400

| Prefix (IPha) | OUTPUT PORT |
|---|---|
| MN1-ha | IF1 |
| MN2-ha | IF2 |

500

| IP ADDRESS (IPha) | MAC ADDRESS |
|---|---|
| MN1-ha | M1 |
| MN2-ha | M2 |

COMMUNICATION SYSTEM, COMMUNICATION TERMINAL, ROUTING CONTROL METHOD, AND ROUTER

CROSS REFERENCE TO RELATED APPLICATIONS

This application is based upon and claims the benefit of priority from the prior Japanese Patent Applications No. 2003-316011, filed on Sep. 8, 2003; the entire contents of which are incorporated herein by reference.

BACKGROUND OF THE INVENTION

1. Field of the Invention

The present invention is related to a communication system, a communication terminal, a routing control method, and a router, which control a packet transfer route.

2. Description of the Related Art

Conventionally, "$IP^2$" (IP-based IMT Network Platform) has been proposed as a routing control method which is applied in the case where a communication terminal is moved using wireless communication (refer to, for example, T. Okagawa, M. Jo, K. Nishida, and A. Miura, "IP Packet Routing Mechanism Based on Mobility Management in IP-based IMT Network Platform", International Conference on Intelligence in the next generation Networks (ICIN), 2003, and T. Okagawa et al., "IP Packet Routing Mechanism in $IP^2$", The Institute of Electronics, Information and Communication Engineers (IEICE) Technical Report, Mobile Multimedia Communications (MoMuc) 2002-63, November 2002).

In $IP^2$, communication with a mobile communication terminal has been achieved by using two addresses: a unique host address unique to the communication terminal; and a routing host address, which is assigned to the communication terminal by an access router (edge router) and the like for routing between routers.

Figure 1:
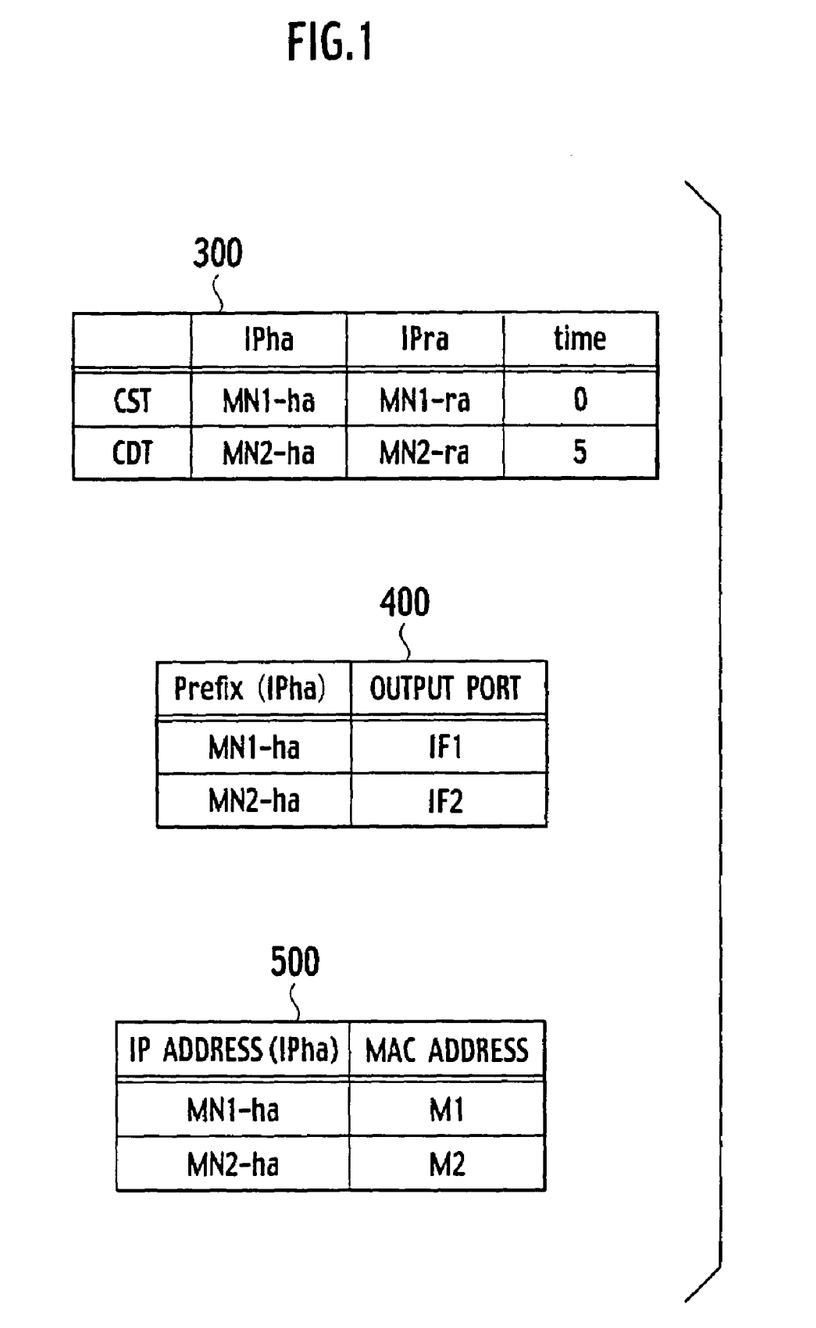
FIG. 1 is a view showing an example of the contents of a routing cache table, a routing table, and a neighbor cache, which are used in a conventional router.

Specifically, as shown in FIG. 1, the access router includes: a routing cache table (RCT) 300 which is a correspondence table between a unique host address (IPha) and a routing host address (IPra); a routing table 400 having routing information which establishes correspondence between a unique host address and an output port of an access router; and a neighbor cache 500 holding information which establishes correspondence between a MAC address (layer 2 address) and an IP address (layer 3 address).

When the communication terminal starts communication through the access router, or executes handover, the access router assigns a routing host address to the communication terminal, that is, the access router establishes correspondence between the routing host address and a unique host address, and, at the same time, updates the contents of RCT 300 and the routing table 400.

Figure 2:
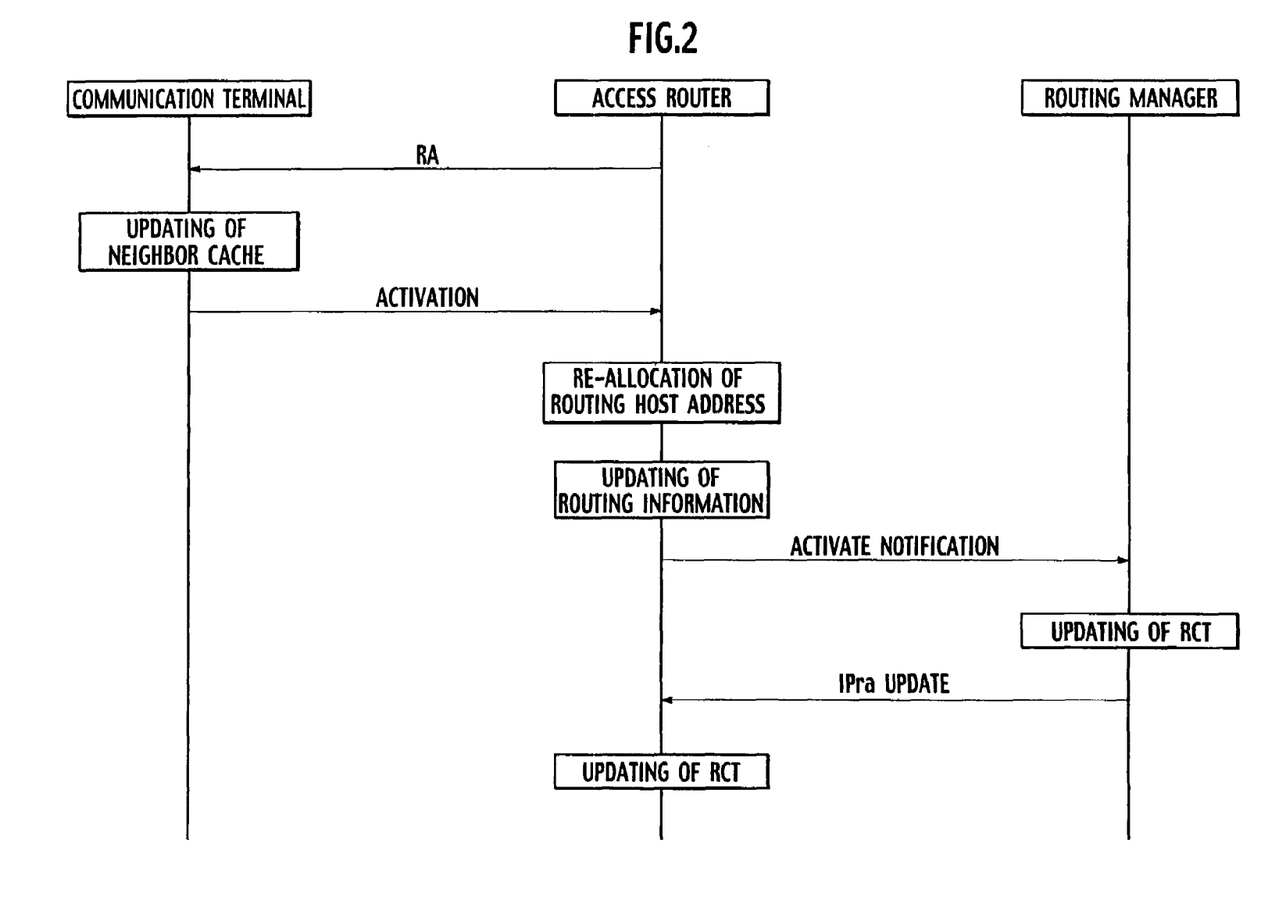
FIG. 2 is a view showing message procedure for a case where the communication terminal executes handover between wireless base stations connected to the same router.

FIG. 2 shows message procedure for a case where handover is executed for the communication terminal under control of the access router, that is, between wireless base stations (access points, base stations, and the like) connected to the same access router. Up on receiving a router advertisement which has been transmitted from the access router through a base station of a destination for handover, the communication terminal updates the neighbor cache created in the communication terminal, and transmits an activation message, which is a message of an upper layer above the layer 3, to the access router.

When the access router receives the activation message, the router re-assigns a routing host address to the communication terminal, and updates the contents of the routing table 400 which establishes correspondence between a unique host address and an output port.

The access router transmits an activate notification message to a routing manager, which is a routing management mechanism in a network, in order to register the correspondence between a routing host address and a unique host address, and updates the contents of RCT 300 according to a routing host address update (IPra update) message transmitted from the routing manager.

Figure 3:
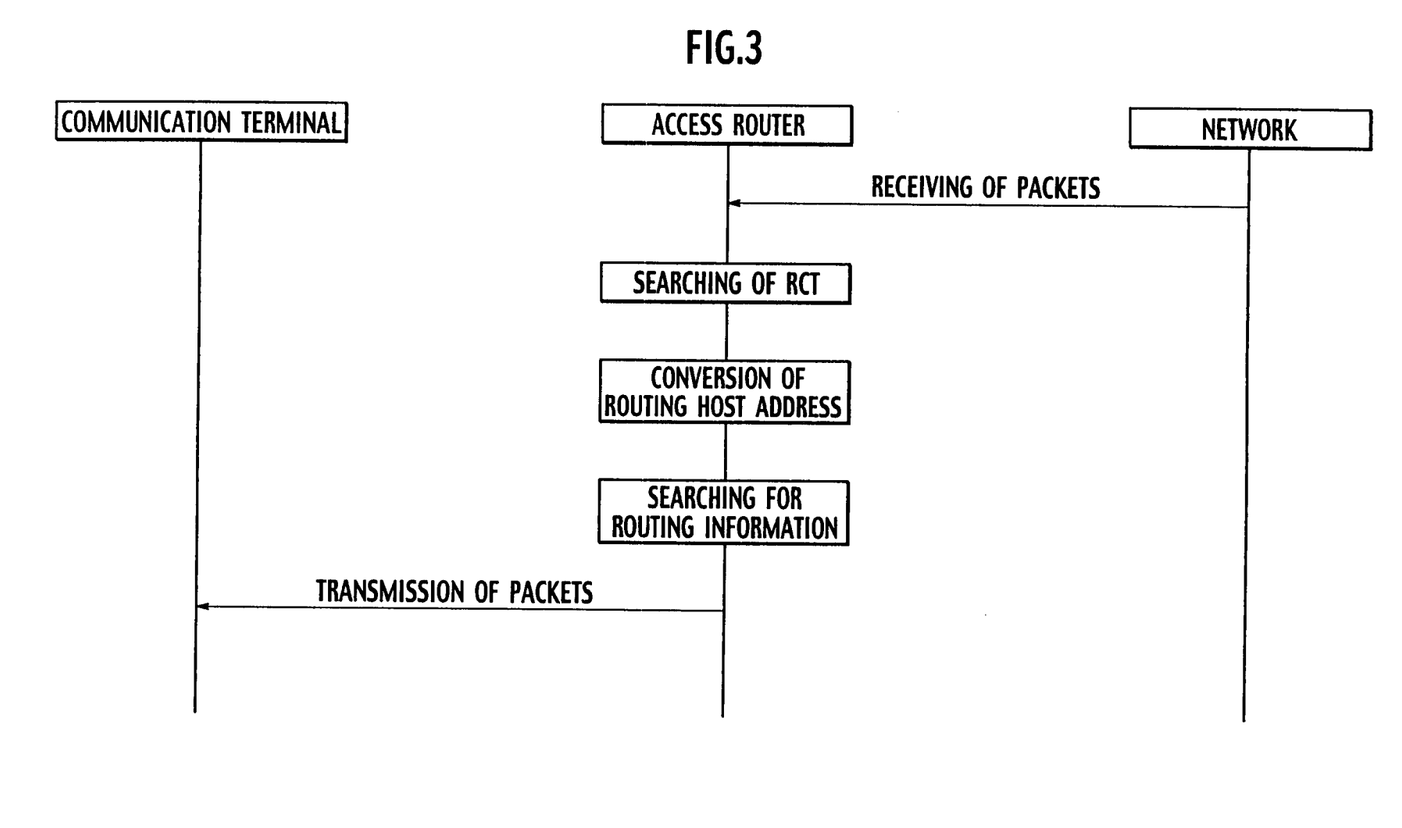
FIG. 3 is a view showing message procedure for a case where a conventional router transfers a packet to a communication terminal.

FIG. 3 shows message procedure for a case where the access router transfers a packet addressed to the communication terminal. As shown in FIG. 3, when the packet addressed to the communication terminal from the network side is received, the access router searches RCT 300 to convert the routing host address included in the received packet, to a unique host address.

The access router then selects a route to the communication terminal, using the routing table 400 based on the converted unique host address, and transmits the packet which has the converted unique host address to the communication terminal.

However, in $IP^2$, when handover is executed between the wireless base stations connected to the same access router for the communication terminal, re-assignment of the routing host address, updating of the routing table 400, updating of RCT 300 in the access router, and updating of RCT in the routing manager are executed as described above, though the correspondence between a unique host address and a routing host address for the communication terminal has been registered in RCT 300 of the access router.

Therefore, there has been a problem in that a certain period of time is required for completion of the handover for the communication terminal even when the handover is executed between the wireless base stations connected to the same access router.

Further, since the routing information establishing correspondence between a unique host address and an output port is registered in the routing table 400, and the amount of information in the routing table 400 is increased according to an increase in the number of communication terminals communicating through the access router, there has been a problem in that the time required to search for routing information is increased, and the high-speed transfer of packets becomes difficult in $IP^2$. Further, since the access router is required to refer to RCT 300, the routing table 400, and the neighbor cache 500 when the packets are transferred, there has also been a problem in that the high-speed transfer of packets becomes difficult.

BRIEF SUMMARY OF THE INVENTION

The present invention has been made in consideration of the above circumstances and its objective is to provide a communication system, a communication terminal, a routing control method and a router, which reduces the time required for handover executed between wireless base stations connected to the same access router, and the high-speed transfer of packets can be realized when a route for packet transfer is controlled using a unique host address and a routing host address.

In order to solve the above-described problems, the present invention has the following features. A first aspect of the present invention is a communication system comprising a communication terminal and a router, wherein the communication terminal comprises a judgment unit configured to judge whether handover is to be executed or not between wireless base stations connected to the router based on a router advertisement transmitted from the router, and a link moving notification transmitter configured to transmit a link moving notification to the router, which indicates that handover is executed between the wireless base stations connected to the router, based on a judgment result by the judgment unit, and the router comprises a routing information updating unit configured to establish correspondence between a unique host address which is unique to the communication terminal and a routing host address used in the router, and to update a routing information which establishes correspondence between the unique host address and an output port for output of a packet addressed to the communication terminal, and wherein, the routing information updating unit only updates the routing information when the link moving notification is received.

According to the above-described aspect, re-assignment of a routing host address and updating of a routing cache table (RCT) can be avoided, and a reduction in the time required for completion of handover can be realized, because only routing information is updated when the router receives the link moving notification indicating that the handover is executed between the wireless base stations connected with the same access router.

Further, the wasting of network resources is avoided according to this aspect, because neither the access router nor a routing manager transmits and receives a message to update RCT.

A second aspect of the present invention is a communication terminal comprising a judgment unit configured to judge whether handover is to be executed or not between wireless base stations connected to a router based on a router advertisement transmitted from the router and a link moving notification transmitter configured to transmit a link moving notification to the router, which indicates that handover is executed between the wireless base stations connected to the router, based on a judgment result by the judgment unit.

A third aspect of the present invention is a routing control method which is used in a communication system comprising a communication terminal and a router, having the steps of judging to judge whether handover is to be executed or not between wireless base stations connected to the router based on a router advertisement transmitted from the router, transmitting a link moving notification to the router, which indicates that handover is executed between the wireless base stations connected to the router, based on a judgment result in the judging step, corresponding a unique host address which is unique to the communication terminal and a routing host address used in the router, updating a routing information which establishes correspondence between the unique host address and an output port for output of a packet addressed to the communication terminal, and wherein, in the updating step, only the routing information is updated when the link moving notification is received.

A fourth aspect of the present invention is a router comprising a routing table storage unit configured to store a routing table which establishes correspondence between a routing host address used between routers and an output port for output of a packet addressed to a communication terminal, an address processor which establishes correspondence between the routing host address and a unique host address which is unique to the communication terminal, based on the routing table, a route selector which selects the output port, based on the routing host address included in the packet and the routing table, and an address converter which converts the routing host address included in the packet into the unique host address, based on the result after establishing correspondence between the routing address and the unique host address by the address processor.

According to the aspect, the contents of a routing table are not updated even if the number of communication terminals which communicate through the router is increased. Therefore, an increase in the amount of information in the routing table can be avoided, and a reduction in the time required to search for routing information can be realized, because a routing table including a routing information which establishes correspondence not between the unique host address and output port but between the routing host addresses and the output port is used.

In other words, if the routing information establishing correspondence between the routing host address assigned to the communication terminal and the output port for a packet is expressed in an integrated manner in the routing table, for example, the routing in formation is expressed per network address in the routing table, the amount of the routing information in the downward direction, i.e., the routing information addressed to the communication terminal can be reduced. Thereby, a reduction in the time required for searching for the routing information, and the high-speed transfer of packets can be realized.

A fifth aspect of the present invention is a router according to the fourth aspect, wherein the route selector selects the output port, using an integrated table which establishes correspondence among the routing host address, the unique host address and the output port, and notifies the unique host address of the communication terminal to the address converter, and the address converter converts the routing host address into the unique host address, based on the notified unique host address.

DETAILED DESCRIPTION OF THE INVENTION

First Embodiment

A first embodiment of the present invention will now be explained. In the first embodiment, an embodiment in which, when a communication terminal executes handover between wireless base stations connected to the same router, the communication terminal transmits a link moving notification that the communication terminal executes handover between the wireless base stations connected to the router, and the router updates only routing information, based on the received link moving notification.

(Network Configuration)

Figure 4:
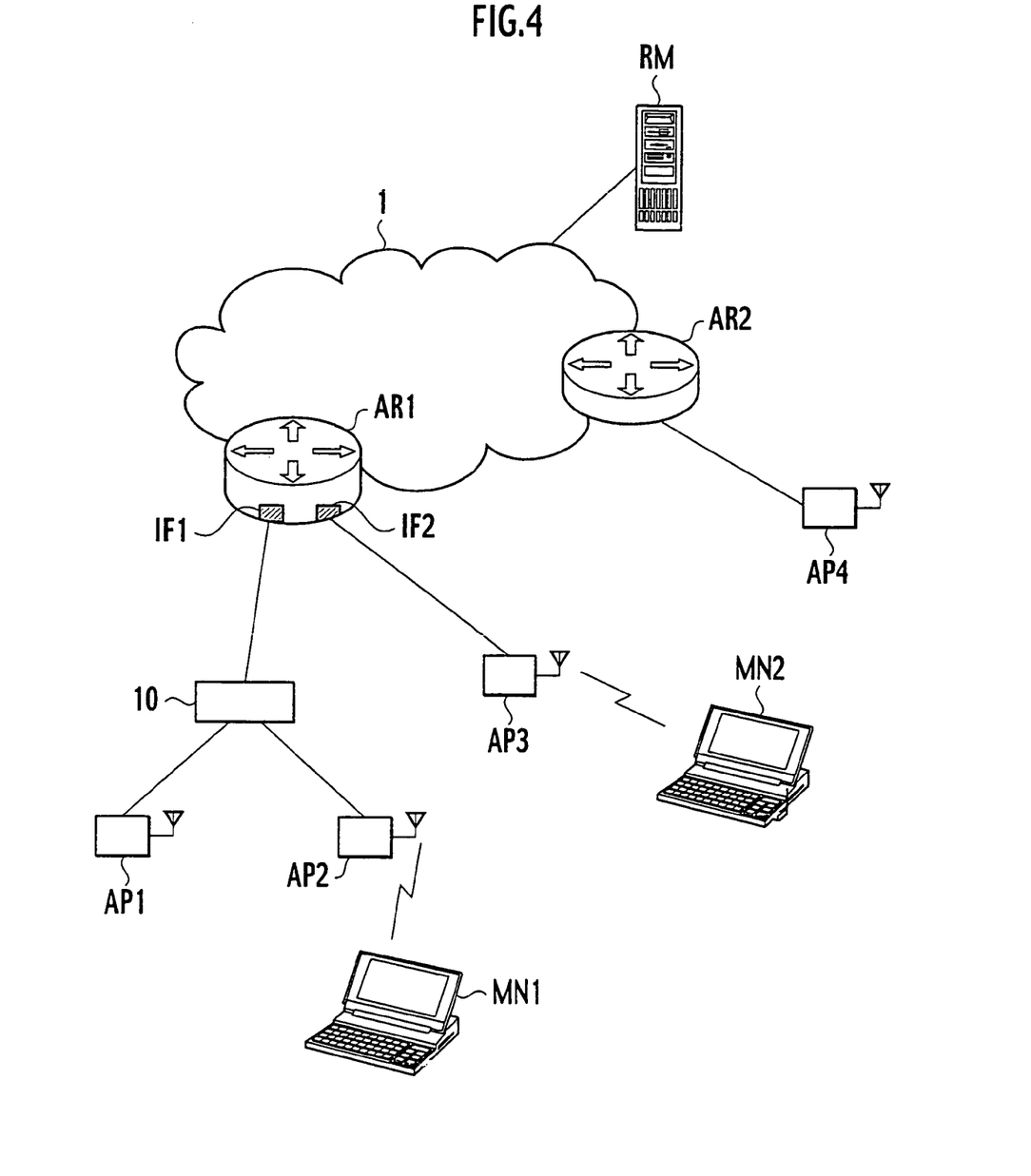
FIG. 4 is a view showing a network configuration including a communication terminal and a router according to an embodiment of the present invention.

FIG. 4 shows a network configuration including a communication terminal and a router according to the first embodiment. As shown in FIG. 4, access routers AR1 and AR2, which are the router of the embodiment are deployed in a network 1 which is the network where packets are forwarded. A routing manager RM that is a route management mechanism in the network 1 is connected to the network 1.

The access router AR1 is connected to access points AP1 and AP2 through a layer-2 switch 10 for switching in the layer 2, using a connection IF1. The access router AR1 is also connected to an access point AP3 using a connection IF2. The access router AR2 is connected to an access point AP4.

The access points AP1 through AP4 are configured to carry out wireless communication with mobile terminals MN1 and MN2 which are the communication terminals of the embodiment. For example, a wireless base station in conformity with a wireless LAN system set forth in the Institute of Electrical and Electronic Engineers (IEEE) can be used as the access points AP1 through AP4. Further, the access points AP1 through AP4 may be a wireless base station, which carries out wireless communication with cellular telephone terminals.

The mobile terminals MN1 and MN2 are communication terminals having a wireless communication function to establish wireless communication with access points AP1 through AP4 and, for example, a personal computer, a personal digital assistant (PDA), a cellular telephone terminal, or the like can be used as the mobile terminals.

(Configurations of Logical Blocks in Communication Terminal and Router)

The configurations of logical blocks for the communication terminal and the router of the embodiment will be explained with reference to FIG. 5A and 5B.

Figure 5A:
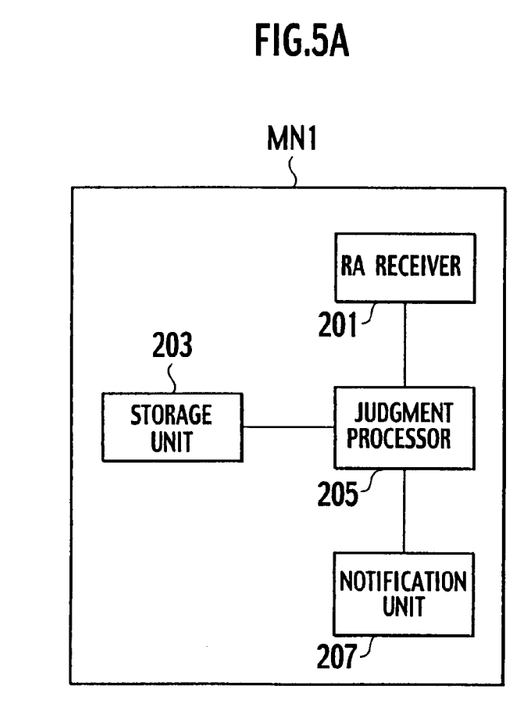
FIG. 5A and FIG. 5B are a view showing configurations of logical blocks for the communication terminal, and the router according to the embodiment of the present invention.
Figure 5B:
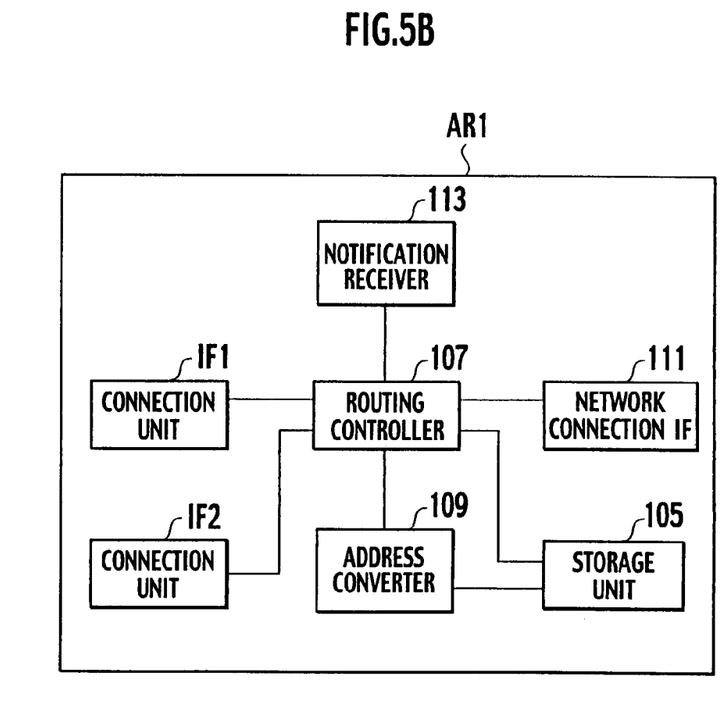

As shown in FIG. 5A and 5B, the mobile terminal MN1 which is the communication terminal of the embodiment includes an RA receiver 201, a storage unit 203, a judgment processor 205 and a notification unit 207. Here, the mobile terminal MN2 has the same configuration as that of the mobile terminal MN1.

As shown in FIG. 5B, the access router AR1 which is the router of the embodiment comprises, a connection IF1, a connection IF2, a storage unit 105, a routing controller 107, an address converter 109, a network connection IF111 and a notification receiver 113. Here, the access router AR2 has the same configuration as that of the access router AR1.

The RA receiver 201 is configured to receive a router advertisement (RA) transmitted from the access router AR1. The RA receiving unit 201 forwards the received router advertisement to the judgment processor 205.

The storage unit 203 is configured to store the contents of a neighbor cache that includes information establishing correspondence between a MAC address and an IP address.

The judgment processor 205 is configured to generate an activation message to be transmitted to the access router AR1 (access router AR2) to start communication, or to execute handover, up on receiving the router advertisement forwarded by the RA receiver 201.

In the present embodiment, the judgment processor 205 also forms a judgment unit which judges, based on the router advertisement transmitted from the access router AR1 (access router AR2), whether handover is to be executed or not between access points (wireless base stations) connected to the same access router.

Specifically, the judgment processor 205 judges whether the router advertisement received through an access point under current wireless communication, and the router advertisement received through an access point of a destination for handover have been transmitted from the same access router.

When the router advertisement received through an access point under current wireless communication, and the router advertisement received through an access point of a destination for handover have been transmitted from the same access router, the judgment processor 205 generates a link moving notification (LMN) which indicates that a link for communication is moved under control of the same access router.

Further, the judgment processor 205 updates the contents of the neighbor cache stored in the storage unit 203, based on the received router advertisement.

The notification unit 207 is configured to transmit the activation message generated by the judgment processor 205 to the access router AR1 (access router AR2).

In the present embodiment, the notification unit 207 is also configured to transmit the LMN, which indicates that handover is executed between the access points (wireless base stations) connected to the same access router, to the access router AR1 (access router AR2) based on the judgment result by the judgment processor 205, and forms a link moving notification transmitter.

Other than the above-described blocks, the mobile terminal MN1 (mobile terminal MN2) has a block, by which data packets are transmitted and received.

Functions of each block of the access router AR1 will now be explained. The connection units IF1 and IF2 are an interface which connects the access points and the layer-2 switch 10, and transmits and receives packets between the units and mobile terminal MN1 (mobile terminal MN2). For example, a LAN interface such as a 100 BASE-TX or the like can be used as the units. Here, the connection units IF1 and IF2 form an output port which outputs packets addressed to the mobile terminal MN1 (mobile terminal MN2).

The storage unit 105 stores RCT 300, the routing table 400 and the neighbor cache 500 as shown in FIG. 1.

The routing controller 107 is configured to select any one of the connection IF1, the connection IF2, or the network connection IF111 to which packets received through the connecting units IF1, IF2, or the network communication IF111 are output, based on the routing table 400 stored in the storage unit 105.

The routing controller 107 also updates the contents of the neighbor cache 500 based on the received activation message, when it is notified from the notification receiver 113 that the activation message has been received.

The routing controller 107 assigns a routing host address to the mobile terminal MN1 (mobile terminal MN2), that is, establishes correspondence between the unique host address and the routing host address of the mobile terminal MN1 (mobile terminal MN2), and transmits an activate notification message to a routing manager RM to update the contents of RCT 300 based on an IPra Update message transmitted from the routing manager RM.

The routing controller 107 then updates the contents of the routing table 400 based on the unique host address assigned to the mobile terminal MN1 (mobile terminal MN2).

In the present embodiment, the routing controller 107 updates only the routing information on the routing table 400 when the access router AR1 receives the link moving notification (LMN) from the mobile terminal MN1 (mobile terminal MN2). Here, in the present embodiment, the routing controller 107 forms a routing information updating unit.

Specifically, the routing control unit 107 neither assigns a new routing host address to the mobile terminal MN1 (mobile terminal MN2), nor updates the contents of RCT 300 when it is notified from the notification receiver 113 that the link moving notification (LMN) has been received.

When it is notified from the notification receiver 113 that the link moving notification (LMN) has been received, the routing controller 107 updates only the routing information on the routing table 400 because the output port of the packet addressed to the mobile terminal MN1 is changed due to handover executed for the mobile terminal MN1 (mobile terminal MN2) between the access points connected to the access router AR1.

The address converter 109 is configured to execute conversion between the routing host address included in the packet received through the network connection IF111 and the unique host address. The address converter 109 also executes conversion between the unique host address included in the packet received through the connection units IF1/IF2 and the routing host address.

The network connection IF111 is an interface, by which packets are transmitted and received between the network connection IF111 and the network 1. For example, a LAN interface such as a 100 BASE-TX or the like can be used as the network connection IF111.

The notification receiver 113 is configured to receive the activation message from the mobile terminal MN1 (mobile terminal MN2), and to notify the routing controller 107 that the activation message has been received. The notification receiver 113 is also configured to receive the activate notification message from the routing manager RM, and to notify the routing controller 107 that the activate notification message has been received.

Further, in the embodiment, the notification receiver 113 is configured to receive the link moving notification (LMN) from the mobile terminal MN1 (mobile terminal MN2), and to notify the routing controller 107 that the LMN has been received.

(Routing Control Method Using Communication terminal and Router)

A routing control method using the communication terminal and the router according to the first embodiment will now be explained.

Figure 6:
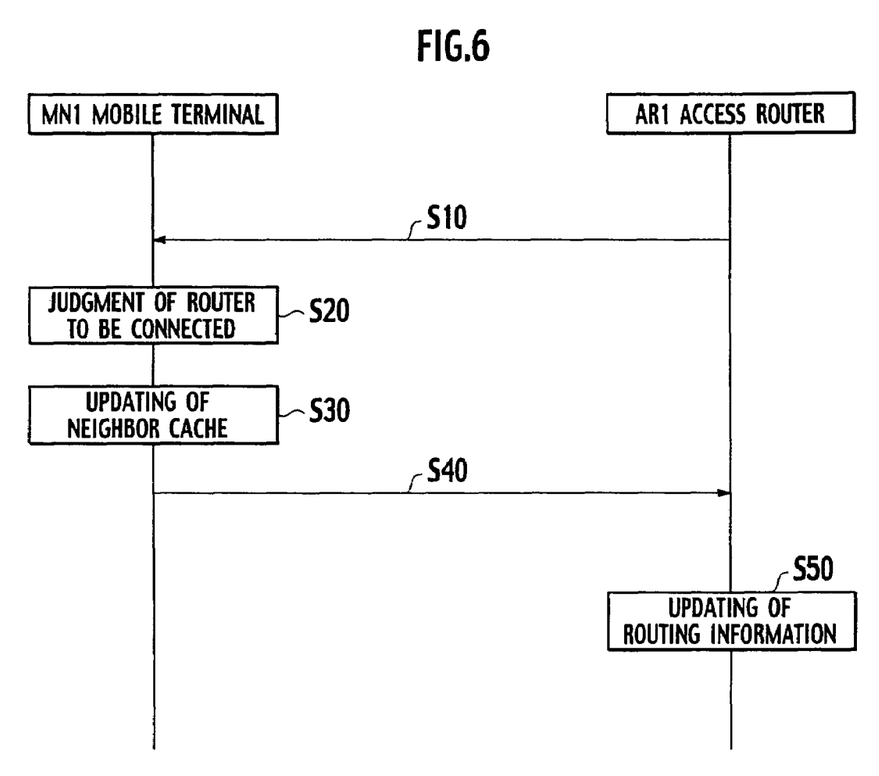
FIG. 6 is a view showing message procedure for a case where the communication terminal executes handover between wireless base stations connected to the same router according to a first embodiment of the present invention.

FIG. 6 shows message procedure for a case in which the mobile terminal MN1 executes handover from the access point AP2 connected to the connection IF1 of the access router AR1 to the access point AP3 connected to the connection IF2 of the access router AR1.

At first, in STEP S10, the mobile terminal MN1 receives a router advertisement from the access router AR1 through the access point AP3 of a destination for handover.

In STEP S20, the mobile terminal MN1 judges, based on the router advertisement received in STEP S10 through the access point AP3 and the router advertisement received through the access point AP2 under current wireless communication, that handover is executed between the access points connected to the access router AR1.

In STEP S30, the mobile terminal MN1 updates the contents of the neighbor cache, based on the advertisement information received in STEP S10.

In STEP S40, the mobile terminal MN1 transmits the link moving notification (LMN), which indicates that handover is executed from the access point AP2 to the access point AP3, both of which are connected to the access router AR1, to the access router AR1.

In STEP S50, the access router AR1 updates only the correspondence between the unique host address of the mobile terminal MN1 and the output port based on the received link moving notification (LMN) in the routing table 400. Accordingly, the access router AR1 neither assigns a new routing host address to the mobile terminal MN1, nor updates the contents of RCT 300 when the link moving notification (LMN) is received.

Here, the mobile terminal MN1 may transmit the link moving notification (LMN) either by multicast or by unicast. Further, the timing at which the mobile terminal MN1 transmits the link moving notification (LMN) to the access router AR1 may not be the same timing at which the router advertisement is received from the access router AR1 through the access point AP3. The timing at which the mobile terminal MN1 transmits the LMN to the access router AR1 may be the timing at which the mobile terminal MN1 switches a radio link to the access router AR1, or to an access point to be connected to the access router AR1.

(Effects)

According to the above-described first embodiment of the present invention, re-assignment of a routing host address and updating of a routing cache table (RCT) can be avoided, and a reduction in the time required for completion of handover can be realized, because only the routing information is updated when the access router AR1 (access router AR2) receives the link moving notification indicating that the handover is executed between the access points connected with the same access router.

Further, the wasting of network resources is avoided according to the first embodiment, since neither the access router nor a routing manager transmits and receives a message to update RCT.

Though $IP^2$ has been explained as an example in the above-described first embodiment, the present invention can also be applied to other communication methods such as mobile IPv6 (MIPv6). In MIPv6, DAD (Duplicated Address Detection) process is performed when a communication terminal executes handover. In the DAD process, "care of address (CoA)" is automatically generated based on a router advertisement received from an access router and no duplication of the CoA on a network is confirmed using multicast.

Further, in MIPv6, control messages (Neighbor Solicitation (NS), and Neighbor Advertisement (NA)) using the multicast are exchanged between the communication terminal and the access router in order to update the neighbor caches in the communication terminal and the access router.

That is, there is a problem being that the network resources are wasted in MIPv6, since the messages using the multicast are exchanged between the communication terminal and the access router. Especially, a measure against impersonations of NS and NA is required, because wireless communication is used between the communication terminal and the access router.

Accordingly, the above-described problem can be solved by transmitting the link moving notification (LMN) using unicast, which indicates that the communication terminal executes handover between the access points connected to the same access router, only to the access router concerned, as described above.

Second Embodiment

A second embodiment of the present invention will now be explained. In the second embodiment, an embodiment in which, a router selects an output port for a packet addressed to a communication terminal based on the routing host address included in the packet using a routing table, which establishes correspondence between a routing host address and an output port, and the router converts the routing host address into a unique host address after selecting the output port to transmit the packet.

Further, in the second embodiment, the router pools a plurality of routing host addresses and uses a routing table establishing correspondence between pooled routing host addresses and output ports in order to avoid updating of the contents of the routing table even when the communication terminal executes handover.

(Network Configuration and Block Configuration of Router)

In the second embodiment, the same network configuration as that of the above described first embodiment is used. Further, the logical block configuration of the router of the embodiment is the same as that of the access router AR1 explained in the first embodiment.

Here, a block which has different functions from the block of the access router AR1 in the first embodiment will be mainly explained with reference to FIG. 5B.

A storage unit 105 of the present embodiment is configured to store a routing table establishing correspondence between a routing host address used for the access routers AR1 or AR2 which forms a network 1, and the connection IF1 (or, connection IF2) which outputs packets addressed to the mobile terminal. The storage unit 105 of the present embodiment forms a routing table storage unit.

Figure 8:
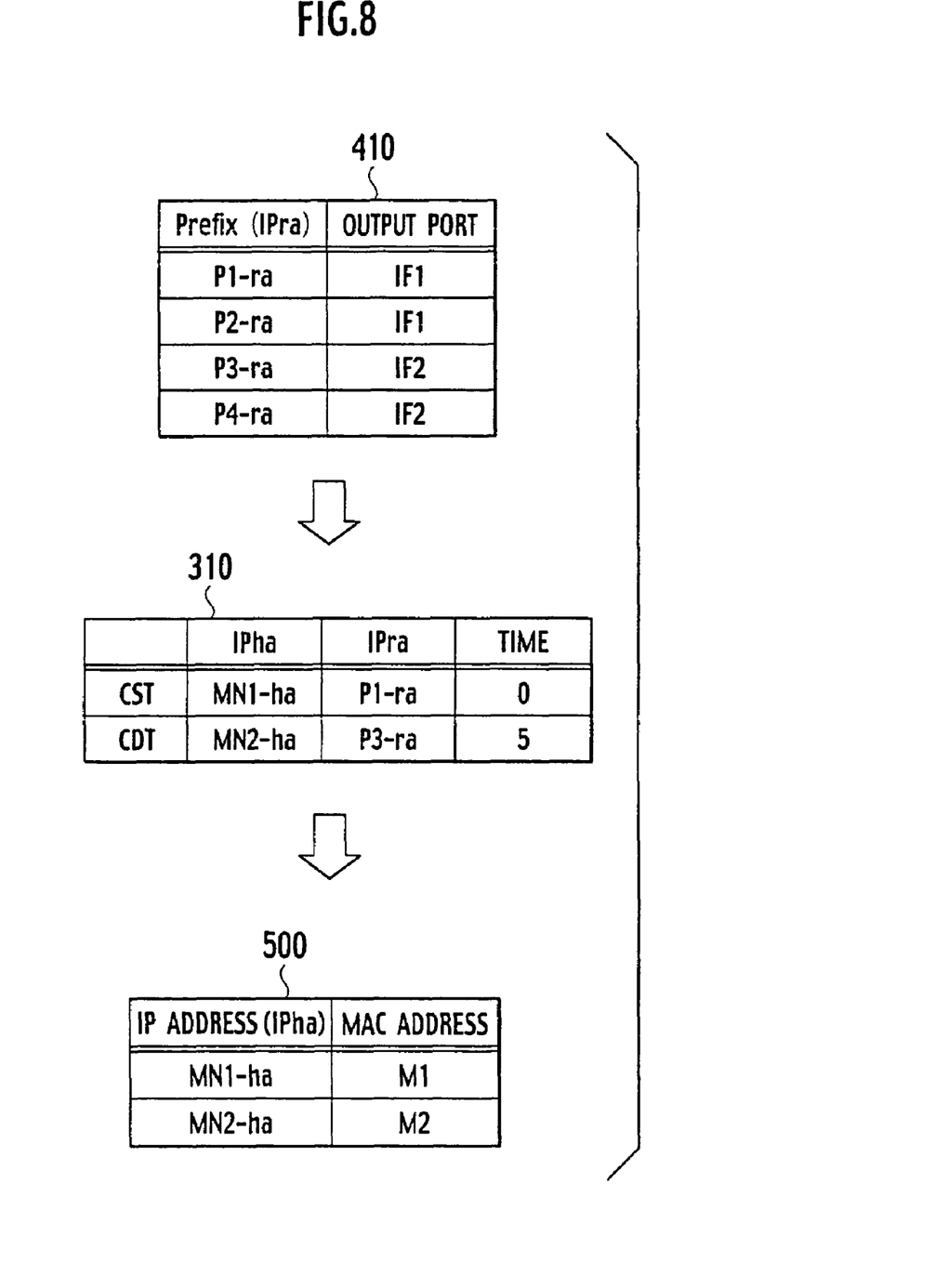
FIG. 8 is a view showing an example of the contents of a routing table, a routing cache table (RCT), and a neighbor cache according to the second embodiment of the present invention.

Specifically, the routing table, in which the contents are different from the conventional ones shown in FIG. 1, and a routing cache table are stored in the storage unit 105. Here, FIG. 8 shows an example of the contents of a routing cache table (RCT) 310, a routing table 410, and a neighbor cache 500, which are stored in the storage unit 105 of the access router AR1 according to the present embodiment. As shown in FIG. 8, the routing table 410 establishes correspondence between the routing host addresses and the output ports, not between the unique host addresses and the output port.

In the present embodiment, the routing controller 107 forms an address processor which establishes correspondence between the routing host addresses and the unique host address of the mobile terminal MN1 (mobile terminal MN2) based on the routing table 410.

Specifically, the routing table 410 includes a routing information establishing correspondence between a plurality of routing host addresses (P1_ra through P4_ra) pooled in the access router AR1 and the output ports (connection IF1 or connection IF2), as shown in FIG. 8.

Here, the pooled host addresses for routing may be expressed, for example, per network addresses in the routing table 410. The access router AR1 may decide the routing host address assigned to the mobile terminal MN1 (mobile terminal MN2) based on the routing table 410 expressed by the network address.

For example, when the routing host address is assigned to the mobile terminal MN1, the routing controller 107 assigns the pooled routing host address to the mobile terminal MN1, based on the output port (connection IF1 or IF2), which is connected with an access point where the mobile terminal MN1 establishes wireless communication, and the routing table 410.

More specifically, for example, in the case where wireless communication is established by the mobile terminal MN1 through. the access point AP2, the access router AR1 refers to the routing table 410, and the routing host address (P1_ra) in correspondence with the output port (connection IF1), to which the access point AP2 is connected, is assigned to the mobile terminal MN1 by the access router AR1.

The routing controller 107 then establishes correspondence between the unique host address (MN1_ha) of the mobile terminal MN1 and the routing host address (P1_ra) as shown in RCT 310. The routing controller 107 then transmits an activate notification message to a routing manager RM and updates the contents of RCT 310, based on a IPra Update message transmitted from the routing manager RM.

In the present embodiment, the routing controller 107 forms a route selector in which the output port (connection IF1 or connection IF2) is selected, based on the routing host address included in the packet addressed to the mobile terminal MN1 (mobile terminal MN2) and the routing table 410.

For example, the routing controller 107 selects the output port (connection IF1), based on the routing host address (P1_ra) included in the packet addressed to the mobile terminal MN1 and the routing table 410 as shown in FIG. 8. Then, based on RCT 310, the routing controller 107 acquires the unique host address (MN1_ha) of the mobile terminal MN1 in correspondence with the routing host address (P1_ra) included in the packet addressed to the mobile terminal MN1.

Further, the routing controller 107 transmits the packet addressed to the mobile terminal MN1 which has been converted into the unique host address (MN1_ha) by the address converter 109 to the mobile terminal MN1, referring to the contents of the neighbor cache 500.

In the present embodiment, the address converter 109 converts the routing host address into the unique host address as a result of correspondence between the routing host address and the unique host address by the routing controller 107, that is, based on the contents of RCT 310.

Here, in the above-described second embodiment, the transmitted packet addressed to the network 1 from the mobile terminal MN1 (mobile terminal MN2), is converted from the unique host address into the routing host address in the address converter 109, based on RCT 310. The routing controller 107 then transmits the packet to the network 1 through a network connection IF111, based on the converted routing host address.

(Routing Control Method Using Router)

A routing control method using a router according to the second embodiment will now be explained with reference to FIG. 7. Here, the mobile terminal MN1 starts communication through the access point AP2 as shown in FIG. 4.

Figure 7:
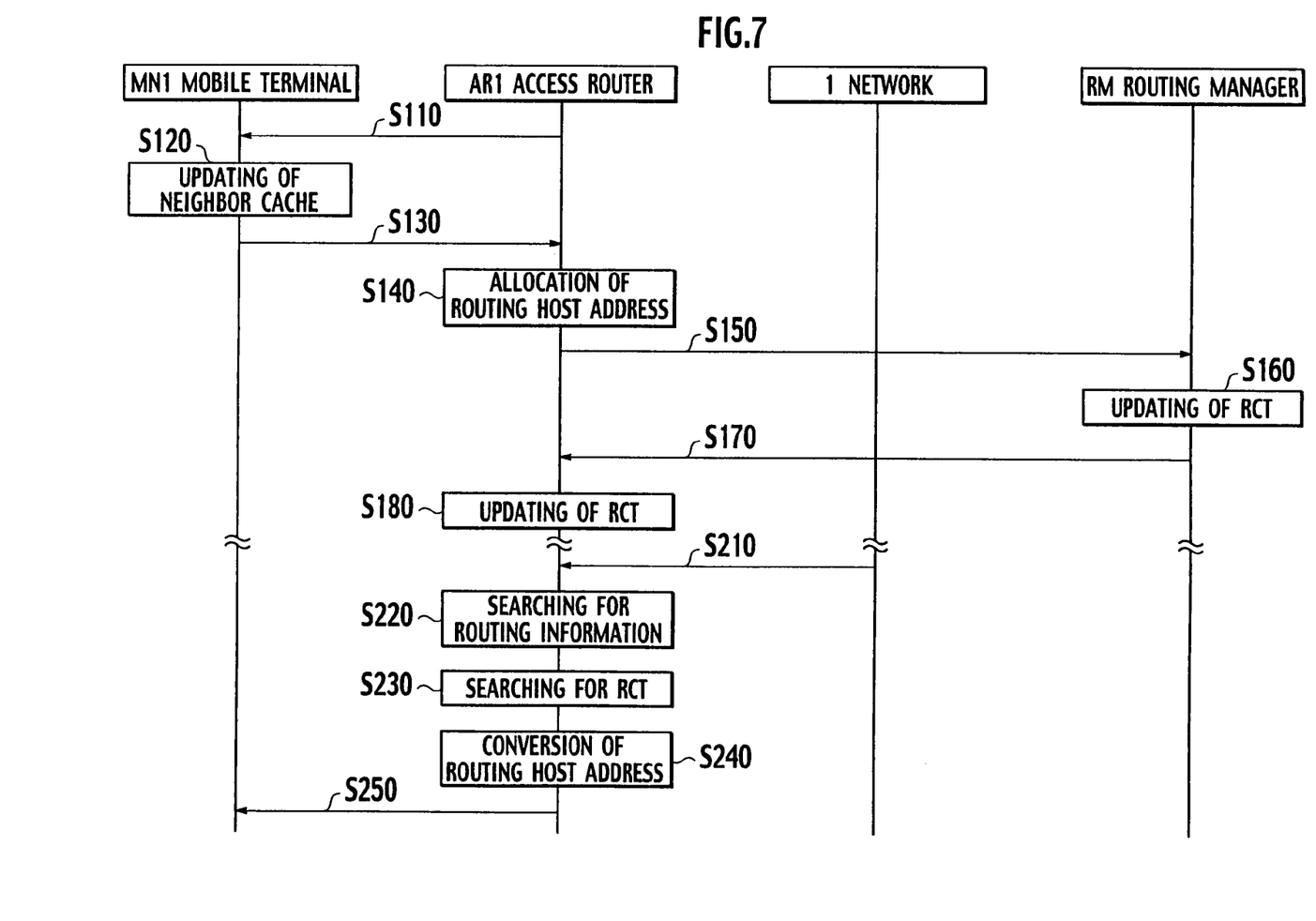
FIG. 7 is a view showing message procedure for the communication terminal, and the router according to a second embodiment of the present invention.

At first, in STEP S110 the mobile terminal MN1 receives a router advertisement transmitted from the access router AR1 through the access point AP2 as shown in FIG. 7.

In STEP S120, the mobile terminal MN1 updates the contents of the neighbor cache, based on the router advertisement received in STEP S110.

In STEP S130, the mobile terminal MN1 transmits an activation message to the access router AR1 for communication through the access router AR1.

In STEP S140, the access router AR1 assigns the routing host address (for example, P1_ra) to the mobile terminal MN1, and establishes correspondence between the routing host address (P1_ra) and the unique host address (MN1_ha) of the mobile terminal MN1, based on the routing table 410, and that the mobile terminal MN1 establishes communication through the access point AP2, that is, communication is established by the mobile terminal MN1 through the connection IF1.

In STEP S150, the access router AR1 transmits the activate notification message to the routing manager RM.

In STEP S160, the routing manager RM establishes correspondence between the unique host address (MN1_ha) to the mobile terminal MN1 and the routing host address (P1_ra), based on the received activate notification message, and updates the contents of the routing cache table (RCT).

In STEP S170, the routing manager RM transmits the IPra update message to the access router AR1.

In STEP S180, the access router AR1 updates the contents of RCT 310, based on the received IPra update message in order to reflect the correspondence between the routing host address (P1_ra) transmitted in STEP S150 and the unique host address (MN1_ha) of the mobile terminal MN1.

Next, message procedure in which the access router AR1 receives the packet addressed to the mobile terminal MN1, and transmits the packet to the mobile terminal MN1 will be explained.

In STEP S210, the access router AR1 receives the packet addressed to the mobile terminal MN1 through the network 1.

Based on the routing host address (P1_ra) included in the received packet addressed to the mobile terminal MN1, in STEP S220, the access router AR1 searches for the routing table 410, and selects the output port (connection IF1) through which the packet is output.

In STEP S230, the access router AR1 searches RCT 310, based on the routing host address (P1_ra) included in the received packet addressed to the mobile terminal MN1, to acquire the unique host address (MN1_ha) of the mobile terminal MN1.

In STEP S240, the access router AR1 converts the routing host address (P1_ra) included in the packet addressed to the mobile terminal MN1 into the unique host address (MN1_ha) of the mobile terminal MN1.

In STEP S250, the access router AR1 transmits the packet that was addressed to the mobile terminal MN1, and has been converted into the unique host address (MN1_ha) of the mobile terminal MN1, referring to the neighbor cache 500, to the mobile terminal MN1.

(Effects)

According to the above-described second embodiment of the present invention, the contents of the routing table 410 are not updated even if the number of mobile terminals which communicate through the access router AR1 (access router AR2) is increased, an increase in the amount of information in the routing table 410 can be avoided, and a reduction in the time required for searching for the routing information can be realized, because correspondence between the routing host address and the unique host address is established, using the routing table 410 including the routing information which establishes correspondence not between the unique host address and the output port, but between the routing host address and the output port.

That is, if the routing information establishing correspondence between the routing host address assigned to the mobile terminal MN1, MN2 and the output port (connection IF1 or IF2) of the packet is expressed in an integrated manner in the routing table 410, for example, if the routing information is expressed per network address, the amount of the routing information in the downward direction, that is, the amount of routing information addressed to the mobile terminal MN1 and the mobile terminal MN2 can be reduced. Thereby, a reduction in the time required for searching for routing information, and the high-speed transfer of packets can be realized.

[Variant]

Though the routing cache table (RCT) and the routing table have been separately provided in the above-described first and second embodiments, a table in which the routing cache table (RCT) and the routing table are integrated together can be used.

Figure 9:
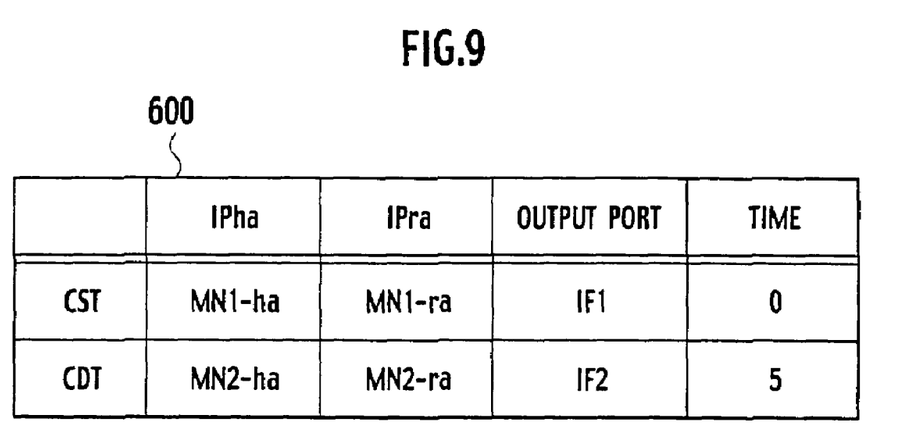
FIG. 9 is a view showing an example of a table into which the routing cache table and the routing table are integrated according to variant of the present invention.

For example, if there is correspondence established among a unique host address (IPha), a routing host address (IPra) and an output port (connection IF1 or connection IF2) as shown in FIG. 9, the above-described first and second embodiments can be realized by using an access router having an integrated table 600.

For example, when the access router AR1 uses the integrated table 600 in the above-described second embodiment, the routing controller 107 selects an output port by using the integrated table 600, and at the same time, notifies a unique host address (MN1_ha) of the mobile terminal MN1 to the address converter 109. Further, the address converter 109 converts a routing host address included in a packet addressed to the mobile terminal MN1 into the unique host address (MN1_ha), based on the notified unique host address (MN1_ha).

That is, further high-speed transfer of packets can be achieved, since the access router AR1 can search the correspondence among routing information, host addresses for routing, and unique host addresses one at a time, using the integrated table 600.

According to the present invention, there can be provided communication system, a communication terminal, a routing control method and a router, which reduces the time required for handover executed between wireless base stations connected to the same access router, and the high-speed transfer of packets can be realized when a route for packet transfer is controlled using a unique host address and a routing host address.

What is claimed is:

1. A communication system comprising a communication terminal and a router, wherein the communication terminal comprises:

a judgment unit configured to judge whether handover is to be executed or not between wireless base stations connected to the router based on a router advertisement transmitted from the router; and a link moving notification transmitter configured to transmit a link moving notification to the router, which indicates that handover is executed between the wireless base stations connected to the router, based on a judgment result by the judgment unit, the router comprises a routing information updating unit configured to establish correspondence between a unique host address which is unique to the communication terminal and a routing host address used in the router, and to update a routing information which establishes correspondence between the unique host address and an output port for output of a packet addressed to the communication terminal, and wherein the routing information updating unit is configured to only update the correspondence between the unique host address and the output port when the link moving notification is received.

2. A routing control method which is used in a communication system comprising a communication terminal and a router, the routing control method comprising:

judging whether handover is to be executed or not between base stations connected to the router based on a router advertisement transmitted from the router;

transmitting a link moving notification to the router, which indicates that handover is executed between the wireless base stations connected to the router, based on a judgment result in the judging;

corresponding a unique host address which is unique to the communication terminal and a routing host address used in the router;

updating a routing information which establishes correspondence between the unique host address and an output port for output of a packet addressed to the communication terminal, and wherein, in the updating, only the routing information is updated when the link moving notification is received.

3. The communication system according to claim 1, wherein the judgment unit is configured to judge whether handover is executed or not between wireless base stations connected to a same router based on the router advertisement received through a wireless base station under current wireless communication and the router advertisement received through a wireless base station of a destination for handover.

4. A communication terminal comprising:

a judgment unit configured to judge whether handover is to be executed or not between wireless base stations connected to the router based on a router advertisement transmitted from the router; and a link moving notification transmitter configured to transmit a link moving notification to the router, which indicates that handover is executed between the wireless base stations connected to the router, based on a judgment result by the judgment unit, wherein the judgment unit is configured to judge whether handover is executed or not between wireless base stations connected to a same router based on the router advertisement received through a wireless base station under current wireless communication and the router advertisement received through a wireless base station of a destination for handover.

5. The routing control method according to claim 2, wherein in the judging, whether handover is executed or not between wireless base stations connected to a same router is judged based on the router advertisement received through a wireless base station under current wireless communication and the router advertisement received through a wireless base station of a destination for handover.

* * * * *